United States Patent

Nakada et al.

[11] 3,970,062
[45] July 20, 1976

[54] ARRANGEMENT FOR HEATING THE SUCTION GASES OF AN INTERNAL COMBUSTION ENGINE

[75] Inventors: Masahiko Nakada; Takehiko Maekawa, both of Toyota, Japan

[73] Assignee: Toyota, Japan

[22] Filed: Sept. 11, 1975

[21] Appl. No.: 612,519

Related U.S. Application Data

[63] Continuation of Ser. No. 419,237, Nov. 27, 1973, abandoned.

[30] Foreign Application Priority Data

July 31, 1973 Japan.................................. 48-85464

[52] U.S. Cl..................... 123/122 AC; 123/122 AB
[51] Int. Cl.² ........................................ F02M 31/00
[58] Field of Search ..... 123/122 AC, 122 R, 122 H, 123/122 AB, 141, 52 MU; 165/52 R; 261/145

[56] References Cited
UNITED STATES PATENTS
3,831,568  8/1974  Heimburg...................... 123/122 H Primary Examiner—Charles J. Myhre
Assistant Examiner—R. H. Lazarus
Attorney, Agent, or Firm—Kenyon & Kenyon

[57] ABSTRACT

An internal combustion with an arrangement for heating the suction gases in order to promote the vaporization of the fuel contained within the suction gases is disclosed. In the arrangement, the exhaust gases exhausted from the engine are routed around fins formed on the exterior wall of the bottom floor of the intake manifold for receiving the heat of the exhaust gases, and a covering is provided for enclosing the fins of the intake manifold in a closed chamber which is defined between the covering and the exterior wall of the intake manifold. The covering is provided with inlet and outlet ports so as to introduce the exhaust gases into the chamber and so as to drain the exhaust gases from the chamber. The introduced exhaust gases heat the entire surface of each fin so that the heat of the exhaust gases is transmitted to the fuel within the suction gases thereby accelerating vaporization of the fuel.

2 Claims, 9 Drawing Figures

ARRANGEMENT FOR HEATING THE SUCTION GASES OF AN INTERNAL COMBUSTION ENGINE

This is a continuation of application Ser. No. 419,237 filed Nov. 27, 1973 and subsequently abandoned.

DESCRIPTION OF THE INVENTION

The present invention relates to an internal combustion engine with an arrangement for the heating of suction gases, in which the intake manifold is heated by the high temperature exhaust gases so that vaporization of the liquid fuel contained within the suction gases flowing in the intake manifold is promoted and more particularly relates to an improved arrangement for heating the suction gases sucked into an internal combustion engine.

Generally, in the starting period of an internal combustion engine, and especially in the starting period of a completely cooled engine or of an engine in the cold season, not only the engine itself but also the suction system for the engine are cold. Therefore, the fuel cannot be completely vaporized, and as a result the engine is not supplied with an appropriate fuel mixture. Also, such incomplete vaporization of the fuel causes unequal distribution of the fuel mixture to each cylinder of the engine. Thus, in such as engine, incomplete combustion or failure of combustion often takes place until the engine together with its suction system is warmed up and,. accordingly, numerous harmful constituents remain in the exhaust gas from the engine.

In order to eliminate the foregoing drawbacks, it has already been proposed to heat the suction system of an engine so as to promote vaporization of the fuel within the suction gases, in the starting period or until the engine warms up. That is, two arrangements for heating the suction systems have been proposed. In the first arrangement, cooling water for the engine is routed adjacent to the intake manifold so that heat absorbed from the engine by the cooling water is employed for heating the intake manifold. In the second arrangement, the exhaust manifold is disposed adjacent to the intake manifold so that the exhaust gases having high temperature and flowing in the exhaust manifold are employed for heating the intake manifold thereby heating the fuel contained in the suction gases flowing in the intake manifold.

However, in the above-mentioned first arrangement, the highest temperature of the cooling water due to absorbing heat from the engine is never too far above one hundred degrees centigrade if the engine is working properly, and also, the temperature rises at a very slow rate. From these facts, the first arrangement employing the cooling water lacks ability to immediately attain the heating of the fuel in the intake manifold. Consequently, the second arrangement employing the exhaust gases which have extremely high temperature as soon as the engine starts, is conventionally used. However, in an internal combustion engine with a conventionally used arrangement for the heating of the suction gases, a shortcoming is encountered, which will be explained later with reference to FIGS. 1 through 3.

Therefore, the object of the present invention is to obviate the shortcoming of the conventionally used arrangement for heating the suction gases of an internal combustion engine.

The present invention will become more apparent from the ensuing description and the accompanying drawings which illustrate both a conventional arrangement for the heating of the suction gas of an internal combustion engine, and, by way of examples, embodiments of the arrangement for the heating of the suction gas of an internal combustion engine of the present invention.

Figure 1:
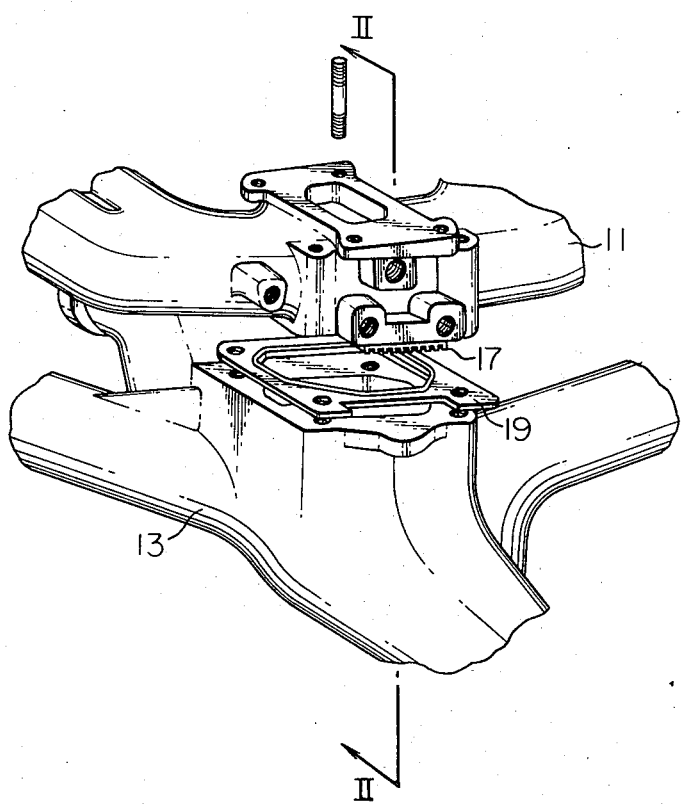
FIG. 1 is a perspective and diassembled view, in part, of intake and exhaust manifolds of an internal combustion engine, in which manifolds, a known arrangement for heating the suction gases is provided.
Figure 2:
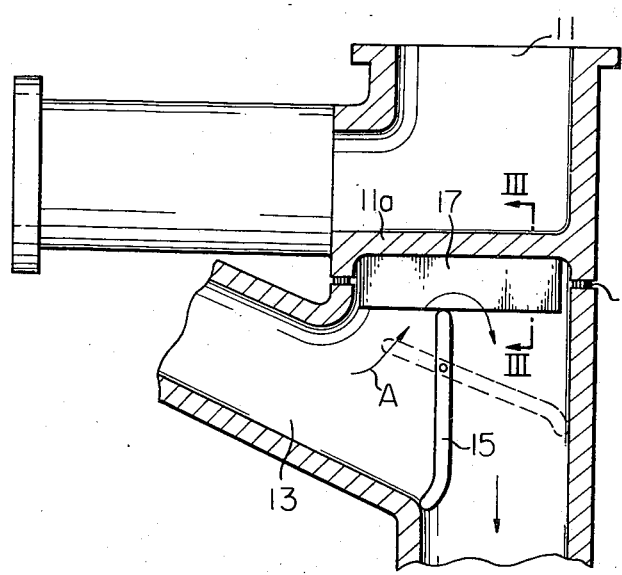
FIG. 2 is a cross sectional view taken along the line II—II of FIG. 1.

In FIG. 1, numerals 11 and 13 represent intake and exhaust manifolds, respectively. The upper end of intake manifold 11 is connectable with a carburetor (not shown) and the branching pipes of intake manifold 11 are connectable with each cylinder of an internal combustion engine. The suction gases are sucked into intake manifold 11 from the carburetor. In FIG. 2 which is a cross sectional view taken along the line II—II of FIG. 1, bottom floor part 11a of intake manifold 11, which is disposed underneath the above-mentioned carburetor, is provided with a number of plate-shaped fins, 17, (refer to FIG. 3) formed on the exterior bottom wall of floor 11a. To the above-mentioned floor, 11a, exhaust manifold 13 is rigidly connected via sealing gasket 19 interposed between intake and exhaust manifolds 11 and 13. In the interior of exhaust manifold 13, plate-shaped valve 15 is disposed so that it can rotate so as to take the two positions shown by the solid and dotted lines.

When valve 15 takes the position shown by the solid line, the exhaust gas coming from the engine and having extremely high temperature is routed so as to contact fins 17. As a result, the heat of the exhaust gases, is transmitted to fins 17, which are formed so as to have large surfaces to receive the heat and subsequently, the fuel flowing into intake manifold 11 is heated by the heat transmitted to fins 17 so that vaporization of the fuel is promoted. However, in this arrangement of FIG. 2, even if valve 15 is kept in the position shown by the solid line, the exhaust gas tends to stream along the line shown by arrow A in FIG. 2 so as to contact only the central part of fins 17. That is to say, at the opposite ends of each fin, 17, direct contact of the fin and the exhaust gases becomes very poor and, therefore, heat transmission efficiency is very poor. In other words, plate-shaped fins 17 provided for the purpose of receiving the heat, cannot efficiently attain their purpose. Therefore, in the end, a considerable amount of time is required for warming-up the engine apparatus including the suction system.

In accordance with the present invention, an improvement is attained in a manner such that the flow of the exhaust gases is controlled so that the exhaust gases are directed equally over the entire surface of each fin of the intake manifold whereby the heat of the exhaust gases is sufficiently transmitted to the fuel streaming in the intake manifold in order to accelerate vaporization of the fuel and to shorten the time required for warming up the engine and the suction system.

Figure 3:
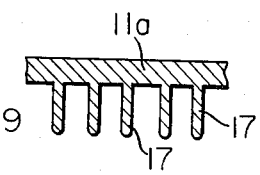
FIG. 3 is a cross sectional view taken along the line III—III of FIG. 2.

The present invention will now be explained with reference to FIGS. 4 through 9. It should be noted that the same parts or elements as those of the prior art of FIGS. 1 through 3 are designated by the same reference numerals.

Figure 4:
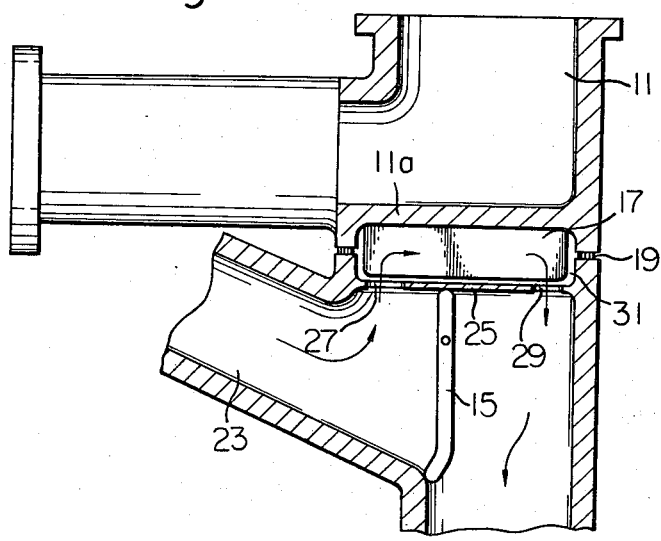
FIG. 4 is a partial cross sectional view taken in the same way as FIG. 2 but of an embodiment of an arrangement for heating the suction gases of an internal combustion engine, according to the present invention.

FIG. 4 is a cross sectional view of an embodiment of an arrangement for heating the suction gases according to the present invention.

Referring to FIG. 4, it will be understood that the outline of the basic arrangement for heating the suction gases according to the present invention is the same as the prior art arrangement of FIG. 2. That is, in the arrangement of FIG. 4, bottom floor part 11a of intake manifold 11 is provided with a number of plate shaped fins, 17, formed as one part with floor part 11a, and exhaust manifold 23 is connected to intake manifold 11 via sealing gasket 19 at the place adjacent to fins 17. However, it should be appreciated that in the arrangement of FIG. 4, horizontal fin covering 25 formed as one part with exhaust manifold 23 is arranged underneath fins 17 in a manner such that closed chamber 31 is defined between covering 25 and floor 11a of intake manifold 11, and fins 17 are enclosed in chamber 31. Covering 25 is provided with inlet port 27 positioned at the upstream end with respect to the flowing direction of the exhaust gases. This inlet port, 27, allows the high temperature exhaust gases to pass therethrough and to enter into chamber 31 so as to contact fins 17 in chamber 31. In order to drain the exhaust gases from chamber 31, coverings 25 is also provided with outlet port 29 positioned at the downstream end with respect to the flowing direction of the exhaust gases. As mentioned above, since inlet port 27 and outlet port 29 are disposed at the opposite ends of covering 25 with respect to the general flowing direction of the exhaust gases, and at the bottom of chamber 31, it should be appreciated that the high temperature exhaust gases coming from an engine are introduced into chamber 31, and the heat of the exhaust gases can be sufficiently transmitted to all surfaces of fins 17 while the exhaust gases move in chamber 31. The exhaust gases which have finished the transmission of the heat thereof to fins 17, come out of chamber 31 through outlet port 29. It should be understood that when the exhaust gases are to be introduced into chamber 31, valve 15 is brought into a closed position, as shown in FIG. 4 by a solid line, in a manner described later, so that the exhaust gases coming from an engine are prevented from directly proceeding into the exhaust pipe positioned downstream of exhaust manifold 23. In the above-mentioned arrangement for heating the suction gases, when intake manifold 11 is required to be heated upon the starting of an engine or before the engine is warmed up, the temperature of the surface of the engine or of the interior of the engine is first detected by a suitable detector. Then when the detected temperature of the engine is lower than a predetermined temperature valve 15 is moved to the closed position, as shown in FIG. 4, by an appropriate operating mechanism. Thus, when valve 15 is in its closed position, the flow of the exhaust gases coming from the engine is directed toward fins 17 in chamber 31 due to the arrangement of inlet and outlet ports 27 and 29 of covering 25. That is, in chamber 31, as seen in FIG. 4, the exhaust gases flow from the leftward end to the rightward end so as to contact all surfaces of fins 17. As a result, all fins, 17, are heated by the heat of the high temperature exhaust gases and, therefore, the liquid fuel of the suction gases, which flows into intake manifold 11, is heated and its vaporization is promoted. This promotion of the vaporization of the fuel improves the operation of the engine and, as a result, the warming-up of the engine and the suction system is accomplished within a shortened time compared to the conventional methods. Also, in the engine, sufficiently vaporized fuel is burnt due to the warming-up of the suction system. As a result, in the exhaust gases, harmful constituents such as carbon monoxide and unburnt hydrocarbon are extremely reduced. Further, attention should be given to the point that the basic arrangement of FIG. 4 is quite similar to the prior art arrangement of FIG. 2. That is, many of the elements in the prior arrangement are employed in the arrangement of the present embodiment and, as a result, there is no disadvantage of increasing the cost in manufacturing the arrangement of this embodiment. This fact, thus renders the arrangement very practical.

Figure 5:
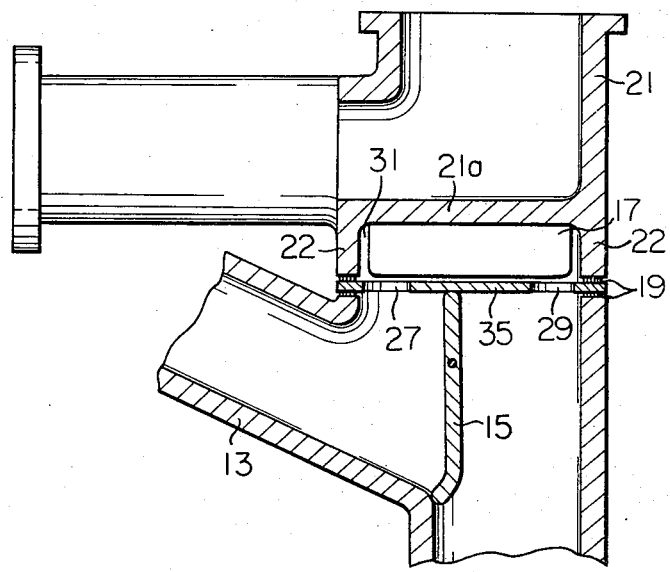
FIG. 5 is the same partial cross sectional view of an another embodiment of the present invention as FIG. 4.

FIG. 5 is a sectional view of another embodiments of the arrangement for heating the suction gases of an internal combustion engine according to the present invention. In the arrangement of this embodiment, a number of plate shaped fins, 17, are still formed as one part with floor 21a of intake manifold 21. Intake manifold 21 is provided with two vertical side walls, 22, having substantially the same heights as fins 17. Further, in this embodiment of FIG. 5, plate shaped horizontal covering 35 which is formed as a separate part from intake and exhaust manifolds 21 and 13 is interposed, together with sealing gaskets 19, between intake and exhaust manifolds 21 and 13. As a result, closed chamber 31 for enclosing fins 17, is defined by floor 21a, vertical side walls 22 and covering 35. Covering 35 is provided with inlet and outlet ports 27 and 29 in the same positional relationship as in the previous embodiment of FIG. 4. Consequently, when valve 15 within exhaust manifold 13 is moved to the closed position as shown in FIG. 5, the high temperature exhaust gases coming from an engine are introduced into chamber 31 through inlet port 27, and subsequently flow into chamber 31 so as to heat all the surfaces of fins 17 and then, are exhausted from outlet port 29 of covering 35 so as to flow away into the exhaust pipe connected to exhaust manifold 13.

Figure 6:
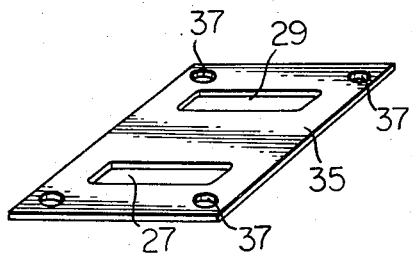
FIG. 6 is a perspective view of a fin cover and for the embodiment of FIG. 5.

FIG. 6 is a perspective view of above-mentioned covering 35 showing inlet and outlet ports 27 and 29 together with mounting holes 37 through with screw bolts for mounting covering 35 pass.

Figure 7:
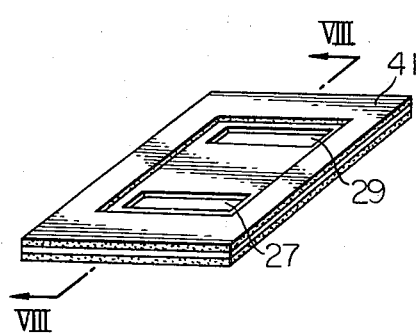
FIG. 7 is an another embodiment of the fin cover of FIG. 6.
Figure 8:
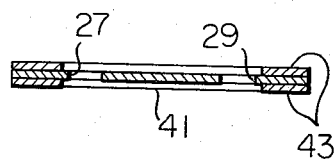
FIG. 8 is a cross sectional view taken along the line VIII—VIII of FIG. 7.

FIG. 7 and FIG. 8 show another covering 41 which is formed as the same separate element as covering 35 of FIG. 6. Covering 41 is also provided with inlet and outlet ports 27 and 29. However, covering 41 is further provided with two sealing gaskets, 43, secured to the top and bottom surfaces thereof as is clearly shown in FIG. 8, which is a cross sectional view taken along the line VIII—VIII of FIG. 7. These sealing gaskets, 43, are made of a material having sealing property. It should be appreciated that this covering, 41, having sealing gaskets 43, compared with covering 35, is easier to mount to intake manifold 21 and exhaust manifold 13, since gaskets 43 have already been secured to covering 41 prior to mounting.

Figure 9:
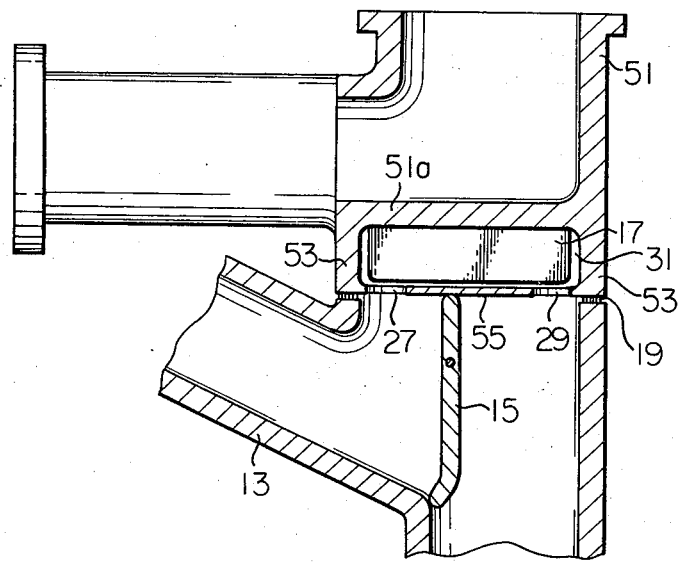
FIG. 9 is the same partial cross sectional view of a further embodiment of the present invention as FIG. 4.

FIG. 9 is a sectional view of a further embodiment of the arrangement for heating the suction gases of an internal combustion engine according to the present invention.

In this embodiment, intake manifold 51 is provided with fins 17 at the exterior wall surface of floor 51a and also, is provided with side walls 53 and covering 55, each being formed as one part with intake manifold 51. Consequently, intake manifold 51 itself is also provided with closed chamber 31 defined by floor 51a, side walls 53 and covering 55. Exhaust manifold 13, therefore, is secured to the bottom most portion of intake manifold 51 via sealing gasket 19. Of course, inlet and outlet ports 27 and 29 are provided in covering 55 at the same locations as in the above-mentioned embodiments.

In the foregoing, the present invention is explained with reference to several different embodiments. However, it should be understood that further modification and variation can be effected without departing from the scope and the spirit of the present invention.

What is claimed is:

1. A heater for incoming fuel-air mixture to an internal combustion engine of the type that includes an intake manifold for said mixture having a bottom floor area; a plurality of heat conducting fins extending downward from the exterior wall of the intake manifold in the bottom floor area; an exhaust manifold disposed underneath the intake manifold adjacent to the finned area for conveying hot combustion products from the engine; a circumscribing wall surrounding the finned area and having a flanged lower face for mating engagement with a flanged opening through the wall of the exhaust manifold underneath the finned area; a partition clamped between the flanged faces of the circumscribing wall and the opening in the wall of the exhaust manifold for enclosing the fins in a chamber defined by the partition, the circumscribing wall, and the exterior wall of the intake manifold, the partition having an inlet port adjacent to one side of the circumscribing wall for introducing the combustion products into the chamber and an outlet port spaced from the inlet port adjacent to the opposite side of the circumscribing wall for exhausting the combustion products from the chamber; and a butterfly type control valve mounted in the exhaust manifold in the way of the opening for rotation about a horizontal axis parallel to the wall between a first position and a second position, the valve when in the first position deflecting the flow of hot combustion gases through the inlet port to contact the fins for heating the intake gases and for returning the combustion products to the exhaust manifold through the outlet port, the valve when in the second position substantially blocking the opening through the wall of the exhaust manifold to prevent the combustion gases from contacting the fins, wherein the improvement comprises:

said partition being a thin plate having a flat unobstructed undersurface, said opening in the wall of the exhaust manifold being obstructed only by said partition, and the upper edge of said butterfly type control valve being positioned contiguous to the flat undersurface of the partition plate between the inlet port and the outlet port when the valve is in the first position a first circumscribing sealing gasket secured to an entire marginal portion of one side of said flat plate and a second circumscribing sealing gasket secured to an entire marginal portion of the other side of said thin plate, said first and second sealing gaskets having openings corresponding to said flanged openings and providing hermetic seals between the one side of the partition and the flanged lower face of the circumscribing wall and the other side of the partition and the flanged opening through the wall of the exhaust manifold, respectively, when the partition is clamped between said flanged faces.

2. The heater of claim 1 wherein the inlet port and the outlet port are disposed at opposite ends of the chamber with respect to the flow direction of said combustion products to assure maximum contact of the combustion products with the fins in the chamber.

* * * * *

UNITED STATES PATENT AND TRADEMARK OFFICE
CERTIFICATE OF CORRECTION

PATENT NO. : 3,970,062
DATED : July 20, 1976
INVENTOR(S) : Masahiko Nakada and Takehiko Maekawa It is certified that error appears in the above-identified patent and that said Letters Patent are hereby corrected as shown below:

Cover sheet, Item [73]: after "Assignee: Toyota" insert --Jidosha Kogyo Kabushiki Kaisha--.

Column 1, line 27: change "as" to --an--.

Column 2, line 22: change "and" to --used--.

Column 4, line 30: change "embodiments" to --embodiment--.

Column 4, line 58: change "with" (second occurrence) to --which--.

Signed and Sealed this

Fourteenth Day of December 1976

[SEAL]

Attest:

RUTH C. MASON
*Attesting Officer*

C. MARSHALL DANN
*Commissioner of Patents and Trademarks*